(12) United States Patent
Wu et al.

(10) Patent No.: US 6,728,440 B1
(45) Date of Patent: Apr. 27, 2004

(54) METHOD AND APPARATUS FOR MULTI-PASS PHOTONIC PROCESSORS WITH CIRCULATORS AND MULTIPLE-FIBER COLLIMATORS

(75) Inventors: Shudong Wu, Fremont, CA (US); Xiaofan Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 133 days.

(21) Appl. No.: 09/896,555

(22) Filed: Jun. 28, 2001

(51) Int. Cl.$^7$ .............................. G02B 6/32; G02B 6/42; H04J 14/02
(52) U.S. Cl. .............................. 385/34; 385/33; 385/47; 398/81
(58) Field of Search .............................. 398/81; 385/47, 385/123, 33, 34, 11, 23, 24, 31, 36, 37

(56) References Cited

U.S. PATENT DOCUMENTS

| | | | | |
|---|---|---|---|---|
| 6,055,347 A | * | 4/2000 | Li et al. ..................... | 385/34 |
| 6,201,904 B1 | * | 3/2001 | Kato ........................... | 385/15 |
| 6,408,117 B1 | * | 6/2002 | Mollenauer ................. | 385/37 |
| 6,454,465 B1 | * | 9/2002 | Uschitsky et al. ............ | 385/79 |
| 6,487,342 B1 | * | 11/2002 | Wu et al. ..................... | 385/39 |
| 6,584,249 B1 | * | 6/2003 | Gu et al. ...................... | 385/47 |
| 2002/0044738 A1 | * | 4/2002 | Jablonski et al. ............. | 385/27 |
| 2002/0110322 A1 | * | 8/2002 | Brun et al. ................... | 385/33 |

* cited by examiner

*Primary Examiner*—Brian Healy
*Assistant Examiner*—Kevin S. Wood
(74) *Attorney, Agent, or Firm*—Sawyer Law Group LLP

(57) ABSTRACT

The present invention provides the method and apparatus for multi-pass photonic processors with the use of circulators and multiple-fiber collimators. In one embodiment of the present invention, a circulator and a reflective element are placed at either end of a chain of cascaded processors. The circulator at a first end routes the light signal to be processed and passed from one processor to the next, the reflective element at a second end reflects the light to be reprocessed and passed from one processor to the previous, the light signal eventually reaches the circulator again and exits. In another embodiment of the present invention, multiple fiber strands are connected to the collimator of a photonic processor. Furthermore, all fiber strands are paired in order to reroute the light signals for reprocessing in the photonic processor.

4 Claims, 5 Drawing Sheets

METHOD AND APPARATUS FOR MULTI-PASS PHOTONIC PROCESSORS WITH CIRCULATORS AND MULTIPLE-FIBER COLLIMATORS

BACKGROUND INFORMATION

1. Field of Invention

The invention relates to the field of fiber optic components, and more particularly to photonic processors.

2. Description of Related Art

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal having light of a specific restricted wavelength range, may be transmitted along the same optical fiber.

Each individual information-carrying light is referred to as either a "signal" or a "channel". The totality of multiple combined signals in a wavelength-division multiplexed optical fiber, optical line, or optical system, where each signal is of a different wavelength range, is referred to as a "composite optical signal".

Due to the rising demand for higher capacity fiber optic systems, physical problems such as chromatic dispersion have conventionally been resolved or alleviated with optical devices such as Gires-Tournois interferometer (GT cavity) dispersion compensators. Moreover, the devices may be cascaded to increase the bandwidth. However, device cascading results in less compact designs while raising the cost of the designs with increasing cascaded devices.

Accordingly, there is a need to reduce the number of devices in a cascaded configuration while maintaining the present bandwidth.

SUMMARY OF THE INVENTION

The present invention provides the method and apparatus for multi-pass photonic processors with the use of circulators and multiple-fiber collimators. In one embodiment of the present invention, a circulator is placed at one end and a reflective element at the other end of cascaded photonic processors. The circulator first directs the light signal into a first end of cascaded chain of processors where the signal is processed by all processors in the cascaded chain of processors; a reflective element at a second end of cascaded chain of processors subsequently redirects the light signal back into the cascaded chain of processors to be processed for a second time; the light signal then exits the chain via the circulator. In another embodiment of the present invention, multiple fiber strand pairs are connected to the collimator of a photonic processor. The light signal enters the photonic processor via the first fiber of a first fiber strand pair; the processor then processes the signal and reflects the signal with a reflective element in the GT cavity. The signal is then rerouted and reprocessed for as many times as the number of remaining fiber strand pairs and finally exits the processor via the second fiber strand of the last fiber pair.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
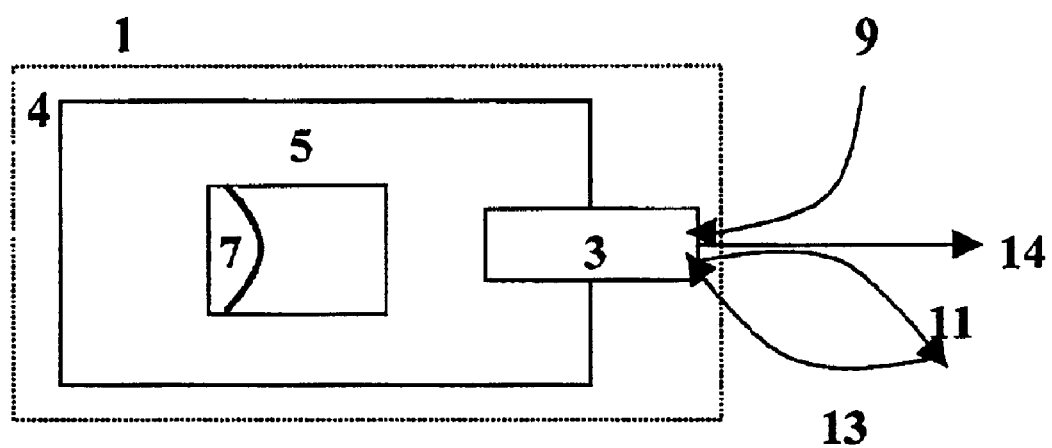
FIG. 1 is a diagram illustrating a dispersion compensator with a multiple-fiber collimator.

The present invention provides the method and apparatus for multi-pass photonic processors with the use of circulators and multiple-fiber collimators. FIG. 1 illustrates one embodiment of the present invention where reference numeral 1 represents a dispersion compensator, the compensator encompasses four main components: reference numeral 4 denotes a device casing; reference numeral 3 denotes a collimator mounted at a first end of the casing 4; reference numeral 5 denotes a Gires-Tournois interferometer (GT cavity) mounted inside the casing 4; and reference numeral 7 denotes a reflective element mounted inside the GT cavity 5. The reference numerals 9 and 11 denote a first fiber strand pair connected to the collimator 3 and reference numerals 13 and 14 denote a second fiber strand pair connected to the collimator 3.

As a light signal travels to the compensator, it first enters the collimator via the fiber strand denoted by the reference numeral 9; the light signal is then processed by the compensator and subsequently reflected by the reflective element denoted with reference numeral 7. The compensator then outputs the processed light signal onto the fiber strand denoted with reference numerals 11, which reroutes the light back into the compensator via the connected fiber strand 13 for further processing. Moreover, when the light signal has been processed for a second time, it's again reflected by the reflective element denoted with reference numeral 7 and exits the compensator via the fiber strand denoted with reference numeral 14. Light signals that enter the embodiment shown in FIG. 1 are processed twice, thereby reducing the number of compensators necessary to half. Furthermore, although the embodiment shown in FIG. 1 contains only two fiber pairs and thus processing the light signal twice, the embodiments may easily be altered to include more than two fiber pairs, each additional fiber pair allowing the light signal to be processed by the compensator once more. As an example, a collimator with six strands of fiber encompassing three fiber pairs would allow the light signal to be processed three times and thereby reducing the quantity of compensators to a third of the number of compensators normally employed. Hence, the quantity of devices decreases directly proportionally to the number of fiber pairs connected to the collimator.

Figure 2:
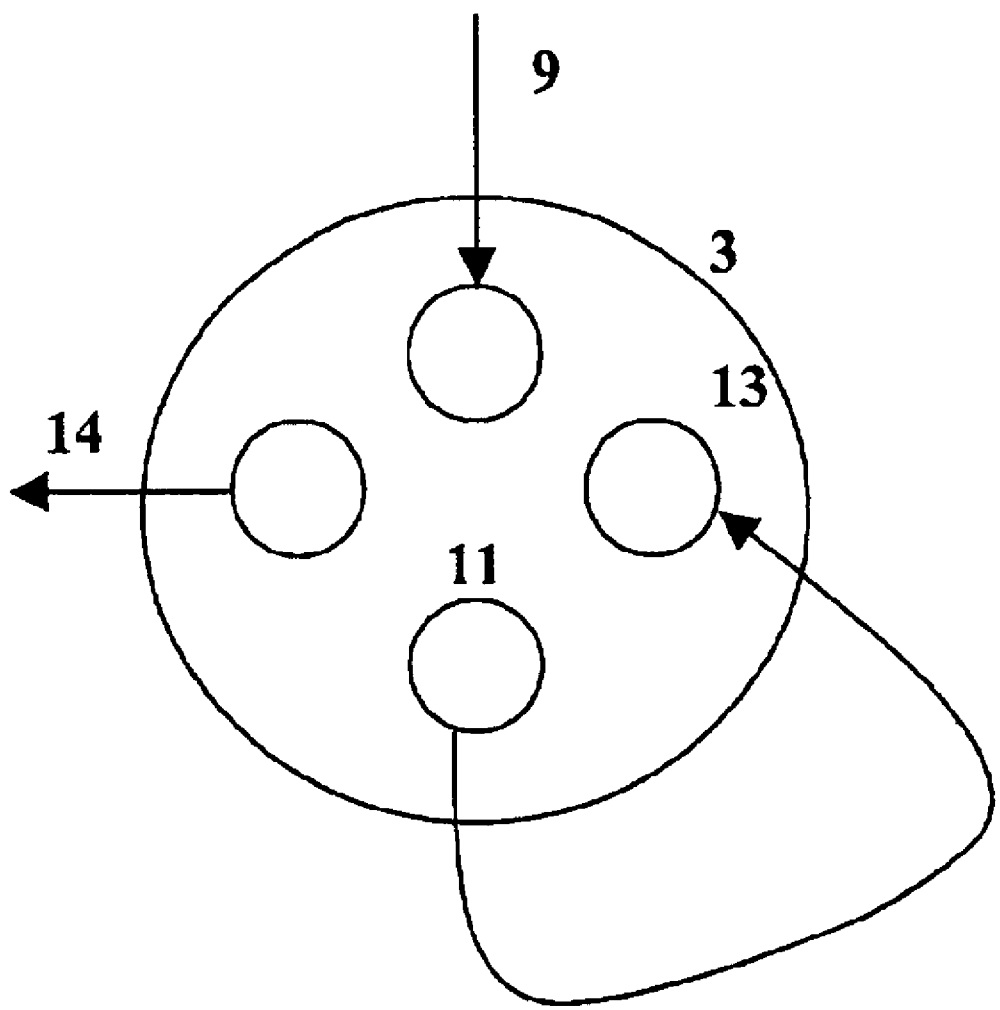
FIG. 2 is a diagram illustrating the multiple-fiber collimator from a cross sectional viewpoint.

FIG. 2 depicts the collimator and fiber strands shown in FIG. 1 from a cross sectional viewpoint. From this viewpoint, the path of the light signal is shown to enter the collimator denoted with reference numeral 3 via the fiber strand denoted with reference numeral 9; the light is then reflected onto the fiber strand denoted with reference numeral 11 and rerouted into the collimator via the fiber strand denoted with reference numeral 13; and the light finally exits the collimator via the fiber strand denoted with reference numeral 14.

Figure 3:
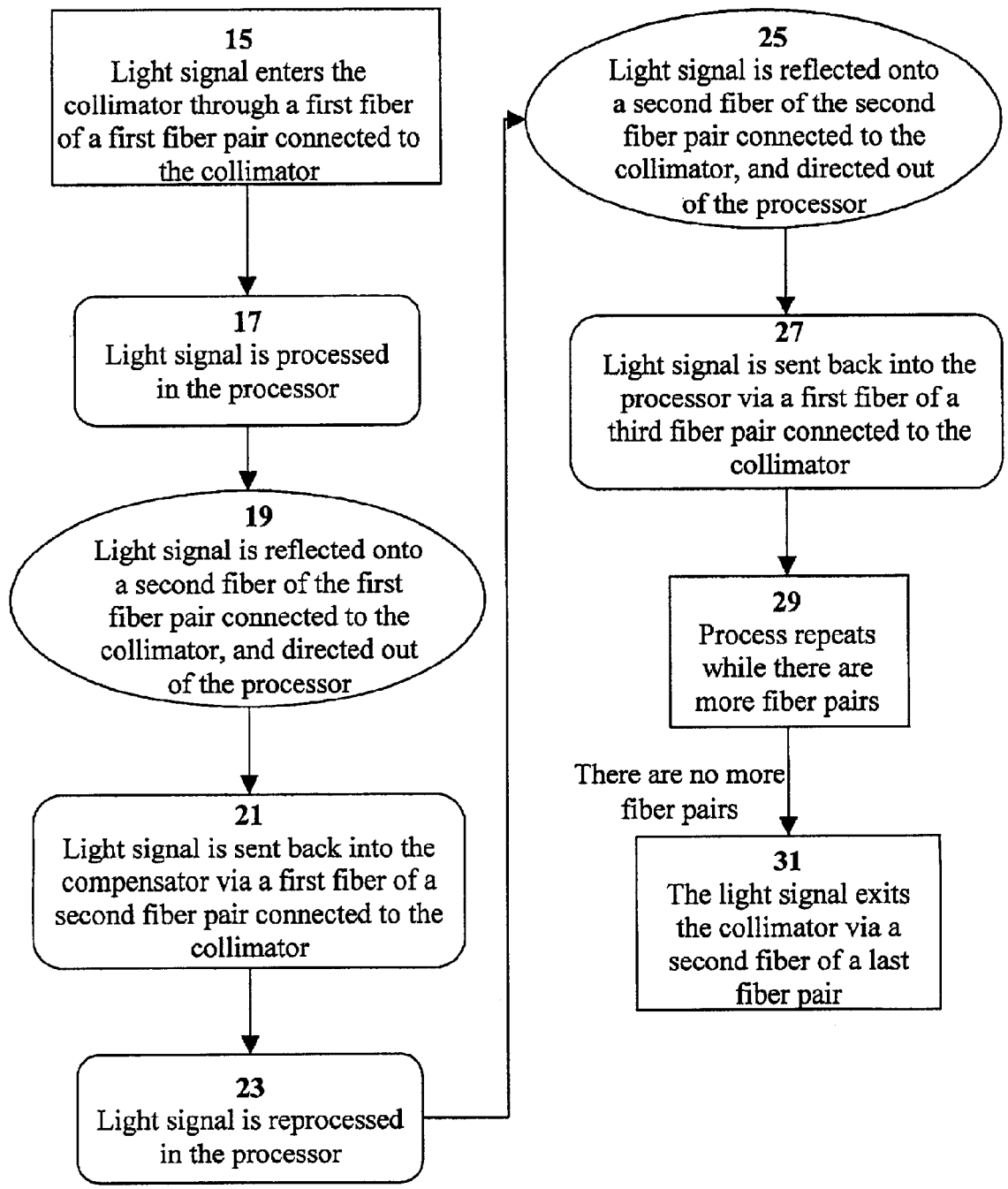
FIG. 3 is a flow diagram illustrating the process shown in FIG. 1 and FIG. 2.

FIG. 3 is a flow diagram illustrating the steps of the process depicted in FIG. 1 and FIG. 2. In step 15, the light signal enters the collimator of the processor via a first fiber strand of a first fiber strand pair. The light signal is then processed by the optical processor in the step denoted 17. Subsequently, a reflective element installed in the GT cavity of the processor reflects the light signal onto a second fiber strand of the first fiber strand pair in the step denoted 19. Step 19 further shows that the second fiber strand of the first fiber strand pair directs the light signal out of the optical processor. Step 21 illustrates that the light signal is subsequently routed back into the optical processor via a first fiber strand of a second fiber strand pair. The light signal is reprocessed in the optical processor in the step denoted 23. Step 25 illustrates that the light signal is again reflected by the reflective element in the GT cavity onto a second fiber strand of the second fiber strand pair and directed out of the optical processor. In step 27, the light signal is again routed into the processor via a first fiber of a third fiber pair connected to the collimator. The signal processing and rerouting repeat until the light signal has been rerouted into the optical processor for reprocessing via all remaining fiber strand pairs and finally exits the processors via a second fiber strand of a last fiber strand pair connected to the collimator.

Figure 4:
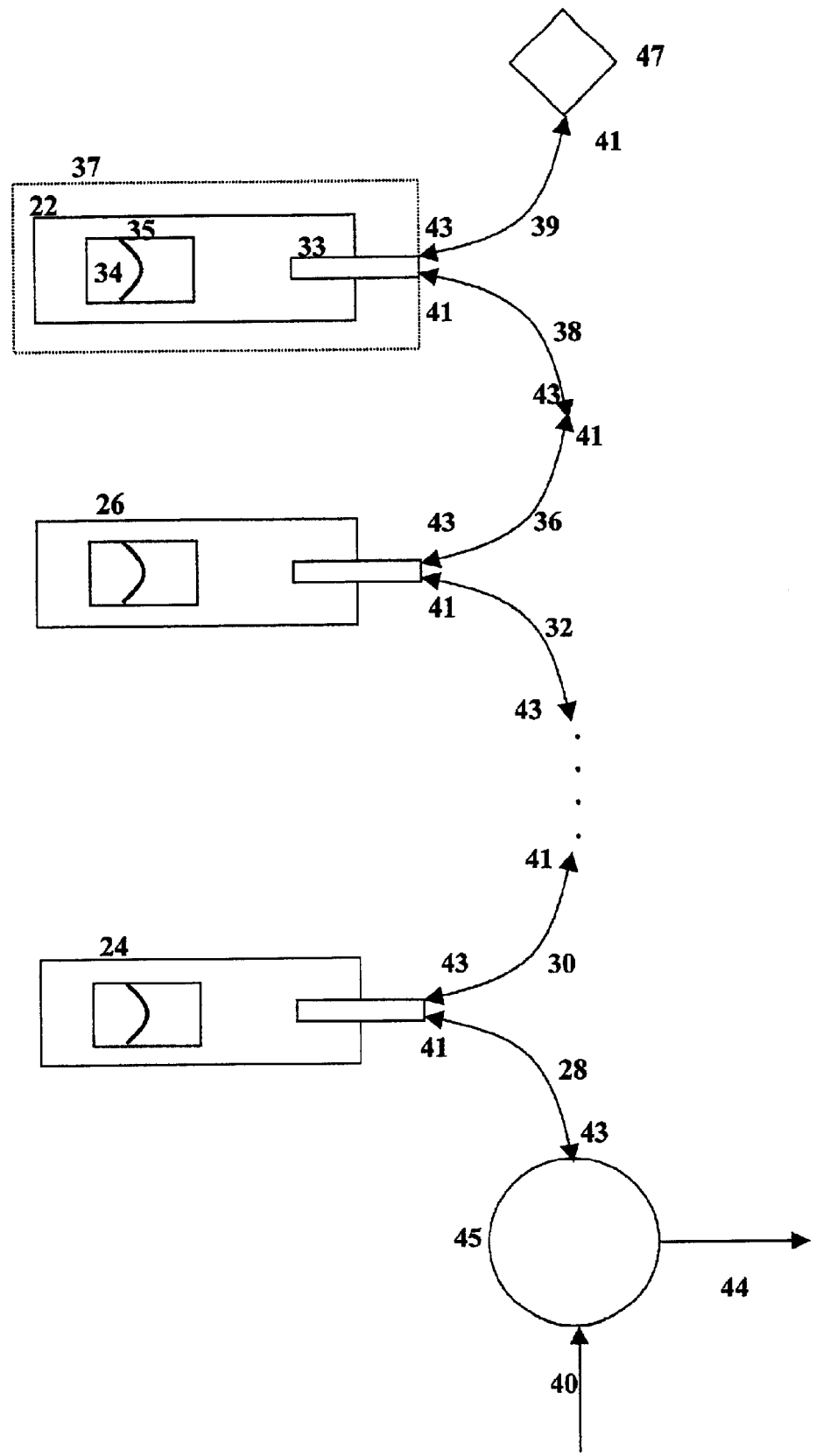
FIG. 4 is a diagram illustrating a circulator and a reflective element connected to either end of cascaded dispersion compensators.

FIG. 4 illustrates another embodiment of the present invention. The reference numeral 37 denotes a dispersion compensator encompassing: a device casing denoted with reference numeral 22; a collimator mounted at a first end of the compensator denoted with reference numeral 33; a Gires-Tournois interferometer (GT cavity) mounted inside the compensator denoted with reference numeral 35; and a reflective element mounted inside the GT cavity 35 denoted with reference numeral 34. Furthermore, FIG. 4 shows that several such dispersion compensators denoted with reference numerals 37, 26, and 24 are configures in a cascaded chain. As shown in FIG. 4, with the exception of the two compensators at either end of the cascaded chain of compensators, all other compensators are connected to another compensator at either side via fiber strands denoted with reference numeral 39, 38, 36, 32, 30, and 28. At a first end of the chain of compensators, a compensator is connected to a circulator denoted with reference numeral 45 on one side and connected to the cascaded compensators on the other side. At a second end of the chain of compensators, a compensator is connected to a reflective element denoted with reference numeral 47 on one side and connected to the cascaded compensators on the other side.

As shown in FIG. 4, a light signal enters the circulator 45 via the fiber strand denoted with reference numeral 40. The circulator then routes the light signal into the first compensator 24 via the fiber strand denoted with reference numeral 28. Subsequently, the compensator 24 processes the light signal and passes the resulting light signal to the next compensator. The light signal is similarly processed and passed from one compensator to the next until it reaches the reflective element denoted with reference numeral 47. The reference numeral 41 denotes the direction of the light signal as it is processed and passed from the circulator to the reflective element via the cascaded compensators. Once the light signal reaches the reflective element denoted with reference numeral 47 via the fiber strand 39, the reflective element 47 reflects the light signal back onto the fiber strand 39 and then into the compensator 37. Subsequently, the compensator 37 reprocesses the signal and passes the resulting light to the previous compensator 26 for reprocessing. The light signal is similarly reprocessed and passed from one compensator to the previous until it is again passed into the circulator 40. Finally, the light signal exits the circulator via the fiber strand 44. The reference numeral 43 denotes the direction of the light signal as it is reprocessed and passed from the reflective element back to the circulator via the cascaded compensators. As shown in FIG. 4, due to the circulator and the reflective element at either end of the cascaded chain of photonic processors, the light signal is processed twice and thereby reducing the number of processors to half of that normally employed.

Figure 5:
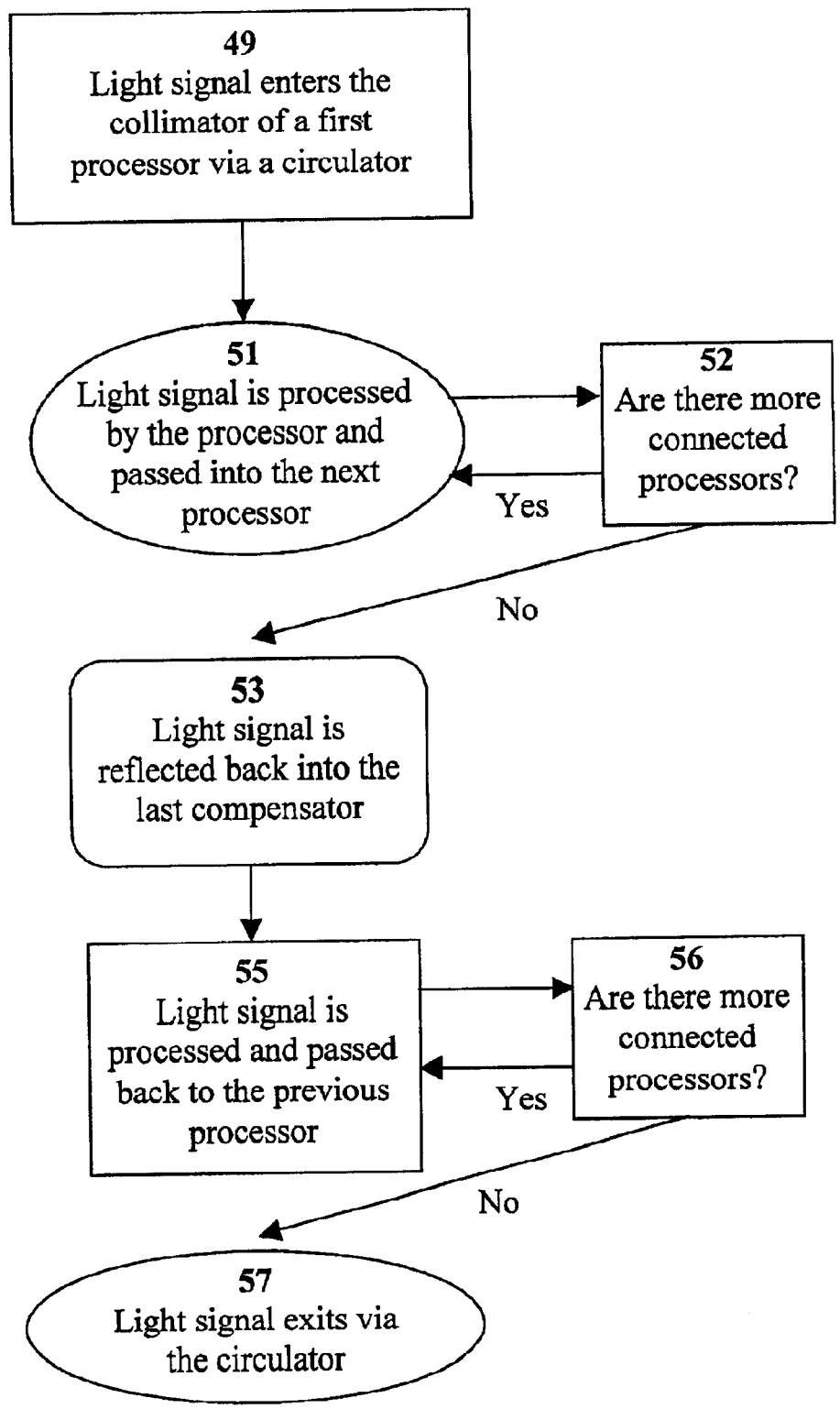
FIG. 5 is a flow diagram illustrating the process shown in FIG. 4.

FIG. 5 is a flow diagram illustrating the steps of the process shown in FIG. 4. The step denoted 49 shows that the light signal enters the collimator of a first processor in a cascaded chain of optical processors via a circulator. Subsequently, the light signal is processed by the first processor and passed into the next connected optical processor for further processing in step 51. Step 52 checks that the light signal has been passed from one processor to the next for processing until the light signal has been processed in all the processors. When the light signal has been processed in all the processors in the chain, it is reflect by a reflective element attached at the end of the chain of processor in step 53. The reflective element then reflects the light signal back into the last processor of the chain of processors. The light signal is subsequently passed from one processor to the previous and reprocessed in all the processors. In step 57, the light signal has been reprocessed by all the processors and exits the chain of processors via the circulator.

We claim:

1. A multi-pass optical apparatus, comprising:
   a collimator comprising:
      a first fiber strand pair having a first fiber strand inputting into the collimator and a second fiber strand for outputting from the collimator;
      a second fiber strand pair having a first fiber strand and a second fiber strand, the first fiber strand of the second fiber strand pair receiving an output from the second fiber strand of the first fiber strand pair and inputting into the collimator, the second fiber strand of the second fiber strand pair outputting from the collimator;
   an optical processor casing; and
   an optical processor, wherein the optical processor is a dispersion compensator.

2. A multi-pass optical apparatus, comprising:
   a collimator comprising:
      a first fiber strand pair having a first fiber strand inputting into the collimator and a second fiber strand for outputting from the collimator;
      a second fiber strand pair having a first fiber strand and a second fiber strand, the first fiber strand pair receiving an output from the second fiber strand of the first fiber strand pair and inputting into the collimator, the second fiber strand of the second fiber strand pair outputting from the collimator;
   an optical processor casing; and
   a Gires-Tournois cavity in the optical processor casing.

3. The apparatus of claim 2, further comprising a reflective element mounted in the Gires-Tournois cavity.

4. The apparatus of claim 3, wherein the reflective element is a mirror.

* * * * *